3,282,796
MICROBIOLOGICAL PROCESS FOR PRODUCING ERGOBASINE
Jurg Rutschmann, Oberwil, Basel-Land, and Hans Kobel, Basel, Switzerland, assignors to Sandoz Ltd. (also known as Sandoz A.G.), Basel, Switzerland
No Drawing. Filed Aug. 27, 1964, Ser. No. 392,596
Claims priority, application Switzerland, Aug. 29, 1963, 10,638/63
9 Claims. (Cl. 195—81)

This invention relates to the production of ergobasine (also known as ergonovine or ergometrine).

Ergobasine is one of the ergot alkaloids occurring in nature and can be isolated from the sclerotiae of *Claviceps purpurea*. This isolation is, however, cumbersome and gives poor yields since in the course of the isolation ergobasine must be separated from the other ergot alkaloids. It is also possible to produce ergobasine semi-synthetically from derivatives of lysergic acid (cf. Helvetica Chemica Acta, volume 26, page 956 [1943]; United States patent specifications Nos. 2,736,728 and 3,084,164). The lysergic acid required in the process referred to must, however, itself first be prepared microbiologically or by the hydrolytic degradation of other, therapeutically less valuable ergot alkaloids, since the total synthesis of lysergic acid on an industrial scale is impossible for reasons of cost.

Because of this pharmacologically valuable properties (oxytocic and vaso-constrictive actions) ergobasine is used medicinally in obstetrics and for the treatment of migraine. Numerous attempts have been made to obtain ergobasine directly by saprophytic cultivation of ergot strains. However, when ergobasine is produced in the culture medium obtained, its concentration is so low that it cannot be produced on an industrial scale in this way. The maximum yield obtained till now is 0.03% based on the solids content of the culture medium (using a strain of *Claviceps microcephala*, see Scientia Sinica, volume 11, pages 917–924 [1962]).

It has now been found that it is possible to produce ergobasine by cultivation of one or both of two new strains of *Claviceps paspali* Stevens and Hall in a yield high enough for the performance of the process on an industrial scale. Thus, it is now possible for the first time to prepare the medicinally important alkaloid ergobasine in a relatively high yield by a single stage microbiological process. The strains used in the new process were isolated from sclerotia found on paspalum dilatatum in Olivarria (Argentina). Specimens of the two strains have been deposited with the United States Department of Agriculture (Northern Utilization Research and Development Division), at Peoria, Illinois, under reference numbers NRRL 3081 and 3082 respectively. Unlike previously described strains of *Claviceps paspali* Stevens and Hall (Arcamone et al., Proc. Roy. Soc. Series B, 155, page 26 [1961]; Nature, 187, page 238 [1960]), but like the strains used in the processes described in our applications Serial Nos. 305,199, now U.S. 3,219,545, and 392,648, NRRL 3027 and 3080 respectively, the new strains are capable of forming conidia in vitro.

The invention accordingly provides a process for the production of ergobasine which comprises culturing one of the strains of *Claviceps paspali* Stevens and Hall, NRRL 3081 and 3082, in a nutrient medium and isolating ergobasine therefrom.

The fact that the new strains will form conidia in vitro, is of considerable industrial importance, since it is known that for carrying out microbiological processes on an industrial scale it is of great importance that the fungus concerned should be capable of forming conidia. Inter alia the formation of conidia makes it possible to perform single-spore isolations and thus to obtain genetically unitary material. Furthermore, it is possible to produce and isolate mutants from conidia, by irradiation with X-rays and ultraviolet rays and with chemicals, much more easily than from sterile mycelium. Furthermore, Paspalum plants can be infected with conidia so that sclerotia are produced naturally on the host plant, and these sclerotia are eminently suitable for preserving the strain. It is possible for instance, to obtain from this stable material at any time fresh inocula when the cultures in vitro degenerate after repeated passages through synthetic media. Conidia can also be lyophilised or freeze-dried and then stored indefinitely, which also makes it easy to preserve the strain. Finally, a conidial suspension is best suited for the inoculation of a nutrient solution because an inoculum of this kind can be most easily measured and is best suited for work under sterile conditions. Sterile mycelium, on the other hand, must first be homogenised in a mixer.

The isolation and multiplication of the new fungus strains are performed in the following manner:

A small specimen of tissue is cut from the inside of a sclerotium and transferred to beerwort agar [composition: 250 ml. of unhopped, light beerwort (dry content 17%), 18 g. of agar-agar distilled water to make 1 litre (pH 5.2)]. A circular colony develops which after 14 days at 24° C. reaches a diameter of 15 mm. It consists of a skin, about 1 mm. thick, of pseudosclerotial structure, lying on the agar and itself covered by a cushion of white aerial mycelium. A brown colour diffuses into the agar. No conidia are formed.

This colony is cut with a spatula into pieces which are then transferred to a test tube containing 12 cc. of the following agar nutrient:

| | |
|---|---|
| Beerwort _____ml__ | 500 |
| Cornsteep solids _____g__ | 60 |
| Lactic acid _____ml__ | 1 |
| Ammonium chloride solution to establish a pH of__ | 4.8 |
| Agar-agar _____g__ | 20 |

Distilled water to make 1 litre.

Around each inoculated fraction forms a small colony of mycelium, which is at first white and then turns reddish brown. After 10 days conidia begin to form at the tips of the hyphae by septation. After 20 days, a sufficient number of conidia have formed for the preparation of an aqueous suspension of them which can be used to inoculate 20 slant agar tubes (using the same agar as before). These cultures are incubated at 24° C. After 24 to 36 hours the conidia germinate. After 6 days the surface of the agar is evenly covered with a fine, white mycelium, and after 10 days a brownish grey, finely wrinkled mycelium blanket has formed which closely covers the agar and has only short aerial hyphae on which conidia form by septation. After 12 days centres form in several places on the mycelium at which small droplets of a reddish brown liquid are exuded. These droplets reach a diameter of 1 to 3 mm. and soon turn turbid owing to the development of very numerous conidia. After 16 to 18 days the conidia formation is substantially complete. A slant agar culture in a test tube of 2 cm. diameter charged with 12 ml. of agar nutrient contains about $10^9$ conidia.

For cultivation by the submerged culture technique a preculture is first prepared in the following manner. The medium used is a 4.5% aqueous malt extract solution of pH 5.4. One litre of this solution is sterilised for 20 minutes at 110° C. in a 2 litre conical flask, then inoculated with $4 \times 10^8$ conidia of a 17-days-old agar culture and incubated for 3 days on a rotating shaking machine at 24° C. A dense culture of fine mycelial flocks form which consist of a loose bunch of hyphae of diameter 2 to 4 mm. No alkaloids can be identified.

To manufacture a substantial quantity of pre-culture, glass fermenters, each containing 10 litres of the same medium, are inoculated with 4×10⁹ conidia each and incubated for 3 days at 23° C. while being aerated with 6 litres of air per minute and stirred at 300 revolutions per minute. Frothing is inhibited with a silicone emulsion. The fermenter cultures obtained in this manner are of the same nature as the agitated cultures. Particularly good results are obtained when the main culture was prepared on a nutrient solution containing, per litre of distilled water:

| | |
|---|---|
| Sorbitol | g.— 50 |
| Succinic acid | g.— 36 |
| Dipotassium phosphate | g.— 2 |
| Magnesium sulphate | g.— 0.3 |
| Ferrosulphate heptahydrate | mg.— 1 |
| Zinc sulphate heptahydrate | mg.— 10 | adjusted to pH 5.4 with ammonium hydroxide. This nutrient solution is inoculated with 10% of a 3-days-old pre-culture and incubated in portions of 100 ml. each in 500 ml. conical flasks at 23° C. on a reciprocating shaking machine. Other cultures are grown in an analogous manner in a stainless steel fermenter containing 170 litres of nutrient solution, aerating with 170 litres of air per minute and stirring at first at 70 and then at 180 revolutions per minute. Frothing was prevented with a silicone emulsion.

In this manner cultures consisting of numerous identical mycelial particles, which have a diameter of about 5 mm. and possess a globulose, compact nucleus of about 1 mm. diameter consisting of pseudoparenchymatic tissue, are obtained. The nucleus displays appendages about 2 mm. long consisting of parallel hyphae, arranged in a star shape. Towards the ends of the cultivation period of about 12 days the mycelium is dark brown, and the filtrate is of a deep reddish brown colour. The pH value changes only insignificantly.

The ergobasine formed is conveniently isolated by extraction with an inert organic solvent at approximately the isoelectric point of the alkaloid. Thus the culture filtrate obtained can be processed, for example, as follows: 20 litres of culture filtrate are adjusted with about 1.2 kg. of sodium carbonate to pH 9.75 and extracted three times using 20 litres of ethylene dichloride on each occasion. The combined organic extracts are washed once with 5 litres of water and then concentrated under vacuum to a total of 4 litres. The concentrate is extracted with 3×1 litre of 5% aqueous tartaric acid, and the tartaric acid extracts are adjusted with sodium carbonate to pH 9.0 and extracted with 3×2 litres of ethylene dichloride. The organic extracts are then washed with a small amount of water and dried over sodium sulphate; they contain 8 g. of total alkaloids. The alkaloid mixture obtained in this manner may be analysed by paper chromatography and the percentual proportions of the individual compositions measured in the usual manner. The mixture analyses as follows:

| | Percent |
|---|---|
| Ergobasine | 65 |
| Ergobasinine | 13 |
| Lysergic acid amide | 9 |
| Isolysergic acid amide | 5 |
| Chanoclavine | 4 |
| Elymoclavine | 1 |
| Peniclavine | 2 |
| Unknown | 1 |

Pure ergobasine can be isolated from the dried organic extracts of the culture filtrate by chromatography, recrystallisation, or by salt formation, for example with organic acids. In this manner there may be isolated 5.39 g. of pure, crystalline ergobasine hydrogen maleate from the 8 g. of total alkaloids obtained.

In accordance with the invention, the culture is effected at a temperature of from 15 to 29° C., preferably at a temperature between 22 and 24° C., in a liquid nutrient, which, in addition to mineral salts and trace elements, contains a carbon source and a nitrogen source. Examples of suitable carbon sources are carbohydrates and polyalcohols, e.g. sorbitol and mannitol, while suitable nitrogen sources are ammonia compounds or amides, preferably ammonium succinate.

When effecting the process of the invention on a relatively large scale, it is advantageous to utilise a pre-culture medium which is inoculated with conidia.

What is claimed is:

1. Process for the production of ergobasine, which comprises culturing one of the strains of *Claviceps paspali* Stevens and Hall, NRRL 3081 or 3082, in a nutrient medium which contains a carbon source and nitrogen source and isolating the ergobasine formed therefrom.

2. A process as claimed in claim 1, wherein the nutrient medium is inoculated with conidia formed by the fungus.

3. A process a claimed in claim 1 in which pre-culture medium is utilised which is inoculated with conidia of the fungus.

4. A process as claimed in claim 1 in which the culture is effected at a temperature of between 15 and 29° C.

5. A process as claimed in claim 1 in which the culture is effected at a temperature of between 22 and 24° C.

6. A process as claimed in claim 1 in which the carbon source is a member selected from the group consisting of carbohydrates and polyalcohols and the nitrogen source is a member selected from the group consisting of ammonia compounds and amides.

7. A process as claimed in claim 1 in which the carbon source is a member selected from the group consisting of sorbitol and mannitol and the nitrogen source is ammonium succinate.

8. A process as claimed in claim 1 wherein ergobasine is isolated from the nutrient medium by extraction with an inert organic solvent after adjustment of the pH of the said medium to approximately the isoelectric point of ergobasine.

9. A process as claimed in claim 1, wherein the culturing is carried out under submerged conditions with continuous aeration of the nutrient medium.

References Cited by the Examiner

UNITED STATES PATENTS

| | | | |
|---|---|---|---|
| 3,060,104 | 10/1962 | Chain et al. | 195—81 |
| 3,110,651 | 11/1963 | Kybol et al. | 195—81 |

A. LOUIS MONACELL, *Primary Examiner.*

ALVIN E. TANENHOLTZ, *Examiner.*